US012606253B2

(12) United States Patent
Muramatsu et al.

(10) Patent No.: US 12,606,253 B2
(45) Date of Patent: Apr. 21, 2026

(54) INSTALLATION STRUCTURE AND VEHICLE HAVING INSTALLATION STRUCTURE

(71) Applicant: Honda Motor Co., Ltd., Tokyo (JP)

(72) Inventors: Yuki Muramatsu, Tokyo (JP); Teruki Komura, Tokyo (JP); Tomoaki Ozaki, Tokyo (JP); Atsuhiro Yamazaki, Tokyo (JP); Takeru Akagami, Tokyo (JP); Takayuki Doi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 412 days.

(21) Appl. No.: 18/349,177

(22) Filed: Jul. 10, 2023

(65) Prior Publication Data

US 2024/0109599 A1 Apr. 4, 2024

(30) Foreign Application Priority Data

Sep. 30, 2022 (CN) .......................... 202211206011.6

(51) Int. Cl.
| | |
|---|---|
| *B62D 25/20* | (2006.01) |
| *B60R 13/08* | (2006.01) |
| *B60R 21/01* | (2006.01) |
| *B60R 21/0136* | (2006.01) |

(52) U.S. Cl.
CPC .............. *B62D 25/20* (2013.01); *B60R 13/08* (2013.01); *B60R 2021/01006* (2013.01); *B60R 21/0136* (2013.01)

(58) Field of Classification Search
CPC ............................ B62D 25/20; B62D 25/2009; B62D 25/2072; B60R 13/08; B60R 13/0815; B60R 13/0869; B60R 2011/0007; B60R 2011/0029; B60R 2011/0059; B60R 2011/0052; B60R 2011/0066; B60R 2011/0071
See application file for complete search history.

(56) References Cited

U.S. PATENT DOCUMENTS

| | | | | |
|---|---|---|---|---|
| 6,728,110 | B2 * | 4/2004 | Koyama .............. | H05K 5/0073 |
| | | | | 361/752 |
| 8,387,457 | B2 * | 3/2013 | Snider ................. | B60R 16/0239 |
| | | | | 73/431 |
| 12,246,662 | B2 * | 3/2025 | Tokito ................. | B60R 16/0239 |

(Continued)

FOREIGN PATENT DOCUMENTS

| | | |
|---|---|---|
| JP | 2015155227 | 8/2015 |

*Primary Examiner* — Gregory A Blankenship
(74) *Attorney, Agent, or Firm* — JCIPRNET

(57) ABSTRACT

The disclosure provides an installation structure and a vehicle having the installation structure. The installation structure is disposed in a vehicle and configured to install a controller, including: a floor panel, constituting a lower portion of a vehicle body of the vehicle; a floor channel, disposed in the floor panel, located at a center in a width direction of the vehicle, extending along a front-to-back direction of the vehicle, and protruding on an upside of the vehicle; a pair of brackets, connected to a corner formed by a side surface and an upper surface of the floor channel; an insulator, configured to cover the floor panel and the brackets; a carpet, disposed on the insulator; and a bracket protrusion, separated from the upper surface of the floor channel and fixing the controller on the bracket protrusion.

20 Claims, 7 Drawing Sheets

(56)            References Cited

U.S. PATENT DOCUMENTS

| | | | |
|---|---|---|---|
| 2011/0248524 A1* | 10/2011 | Wendling | B60N 3/042 296/97.23 |
| 2017/0057431 A1* | 3/2017 | Singh | B60R 13/0815 |
| 2017/0369005 A1* | 12/2017 | Iwata | B29C 43/203 |
| 2018/0257595 A1* | 9/2018 | Baccouche | B60R 13/0869 |
| 2019/0009833 A1* | 1/2019 | Yamagishi | B62D 25/20 |
| 2020/0047818 A1* | 2/2020 | Ebisumoto | B60R 13/08 |
| 2020/0231098 A1* | 7/2020 | Takenaga | B60R 16/0239 |
| 2020/0361535 A1* | 11/2020 | Matsuda | B62D 25/2036 |
| 2023/0339410 A1* | 10/2023 | Kunisada | B60R 11/00 |
| 2024/0023267 A1* | 1/2024 | Ogata | H05K 7/14339 |
| 2024/0109599 A1* | 4/2024 | Muramatsu | B62D 25/20 |

* cited by examiner

INSTALLATION STRUCTURE AND VEHICLE HAVING INSTALLATION STRUCTURE

CROSS-REFERENCE TO RELATED APPLICATION

This application claims the priority benefit of China application serial no. 202211206011.6, filed on Sep. 30, 2022. The entirety of the above-mentioned patent application is hereby incorporated by reference herein and made a part of this specification.

BACKGROUND

Technical Field

The disclosure relates to an installation structure, and more particularly, to an installation structure configured to install a controller in a vehicle.

Description of Related Art

In recent years, efforts have been made to provide sustainable transportation systems that include vulnerable populations such as elderly individuals or children in active transportation participation. In order to achieve the above-mentioned purpose, the research and development related to the livability of the vehicle is aimed at further improving the safety or convenience of transportation. However, in the research and development of vehicle livability, the structural strength and soundproofing performance of vehicles are challenges.

In existing technology, there is a roughly M-shaped bracket installed on the upper portion of the center channel of the vehicle for mounting the side collision detector. The bracket includes a vertical plate-shaped left and right leg portions oriented with the plate surface facing a width direction and a horizontal plate-shaped middle portion located between the left and right leg portions with the plate surface facing an up-to-down direction. The middle portion is disposed lower than an upper end of the leg portion. In addition, left and right mounting portions for mounting a side collision detector are formed between the upper end of the leg portion and the middle portion. As a result, regardless of the height of the center channel, the height of the side collision detector may be properly disposed for each car model, and the load of the side collision may be quickly transferred without deceleration as much as possible.

However, in the portion of the center channel where no bracket is installed, vibrations are prone to occur. In addition, when installing an insulator and a carpet, a gap of the M-shaped bracket will reduce the area of the insulator and the carpet, which will reduce the soundproofing performance. Thus, it is necessary to improve the above structure in the vehicle.

The disclosure aims to achieve good soundproofing effect and structural strength in order to solve the above-mentioned problems. Furthermore, this contributes to the development of sustainable transportation systems.

SUMMARY

The disclosure provides an installation structure that may achieve good soundproofing effect and improve structural strength.

The disclosure provides an installation structure disposed in a vehicle. The installation structure is configured to install a controller, and the installation structure includes: a floor panel, constituting a lower portion of a vehicle body of the vehicle; a floor channel, disposed in the floor panel, located at a center in a width direction of the vehicle, extending along a front-to-back direction of the vehicle, and protruding on an upside of the vehicle; a pair of brackets, connected to a corner formed by a side surface and an upper surface of the floor channel; an insulator, configured to cover the floor panel and the brackets; a carpet, disposed on the insulator; and a bracket protrusion, separated from the upper surface of the floor channel and fixing the controller on the bracket protrusion. The controller is fixed on the bracket protrusion exposed from an opening provided in the insulator and the carpet. The insulator and the carpet are disposed between the controller and the floor channel. A space is provided between the controller and the floor channel.

Based on the above, in the installation structure and the vehicle having the installation structure of the disclosure, by connecting a pair of brackets to the corner of the floor channel, the rigidity of the floor channel is increased, and the insulator and the carpet are disposed on the upside of the bracket between the controller and the floor channel at the same time. In addition, the opening is provided at the fixing portion of the floor channel, so the area for disposing of the insulator and the carpet may be increased, thereby improving the soundproofing effect. In addition, by providing a space between the carpet and the controller, impurities (moisture, etc.) from the carpet may be prevented from adhering to the base of the controller to avoid corrosion of the base.

In order to make the above-mentioned features and advantages of the disclosure comprehensible, embodiments accompanied with drawings are described in detail below.

DESCRIPTION OF THE EMBODIMENTS

Figure 1:
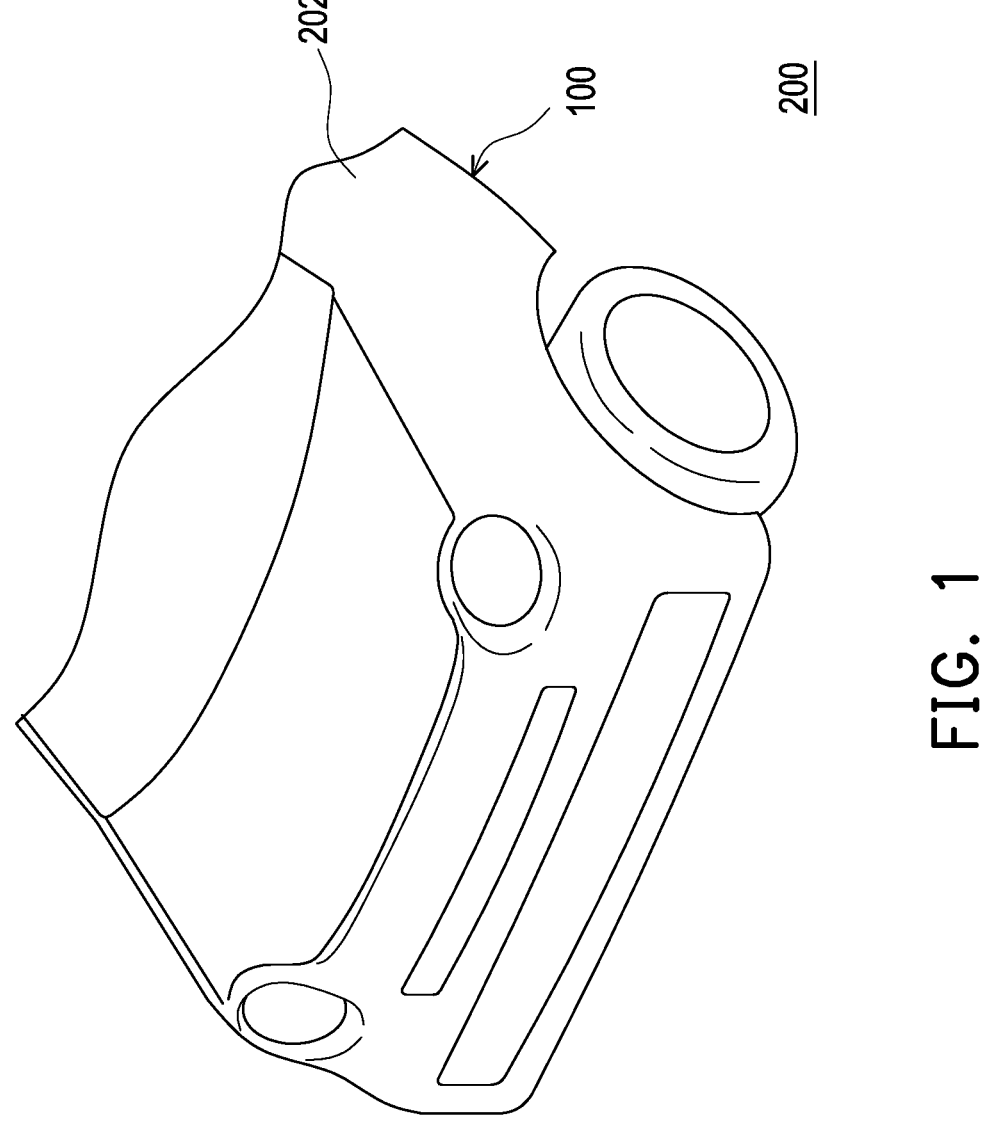
FIG. 1 is a schematic view of a vehicle having an installation structure according to an embodiment of the disclosure.
Figure 1:
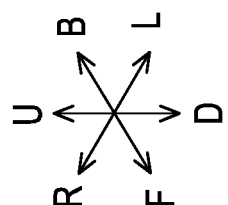

Hereinafter, exemplary embodiments of the disclosure will be described based on the accompanying drawings. It should be noted that in the various embodiments described below, the same reference numerals are used to denote common elements, and redundant explanations are omitted. Hereinafter, with reference to the accompanying drawings, the embodiments of the disclosure will be described.

In an embodiment of the disclosure, the controller includes: a base; a unit housing, in which the base is accommodated; and a leg portion, extending from a lower end of a side surface of the unit housing along the width direction. In addition, the leg portion is fixed to an upper surface of the bracket protrusion.

In an embodiment of the disclosure, the floor channel has a recession, the recession is located at a center in the width direction of the upper surface of the floor channel, and the recession extends along the front-to-back direction of the vehicle.

In an embodiment of the disclosure, in an up-to-down direction of the vehicle, an upper surface of the brackets is disposed at a position not overlapping the recession of the floor channel.

In an embodiment of the disclosure, the corner of the floor channel is located outside the width direction of the recession of the floor channel; and the corner of the floor channel has a stepped appearance and is located on a downside of the vehicle outside the width direction.

In an embodiment of the disclosure, a cut is provided on the insulator and the carpet on two sides in the width direction of the controller; and the cut is disposed along the bracket protrusion and a fixing portion of the controller.

In an embodiment of the disclosure, the bracket is gradually inclined from the floor channel; and the insulator and the carpet are disposed at an inclined position of the bracket.

In an embodiment of the disclosure, a lower surface of the leg portion of the controller is disposed further lower than a lower surface of the unit housing.

In an embodiment of the disclosure, the brackets are formed in an L-shape, the controller is fixed on a cantilever cross section of the bracket.

According to the technical solution of an embodiment of the disclosure, the disclosure further provides a vehicle having the above-mentioned installation structure.

FIG. 1 is a schematic view of a vehicle having an installation structure according to an embodiment of the disclosure. A coordinate system of front F, back B, left L, right R, upside U, and downside D of a vehicle 200 is marked in FIG. 1. Referring to FIG. 1, the vehicle 200 has a vehicle body 202, and an installation structure 100 is disposed on the vehicle body 202.

Figure 2:
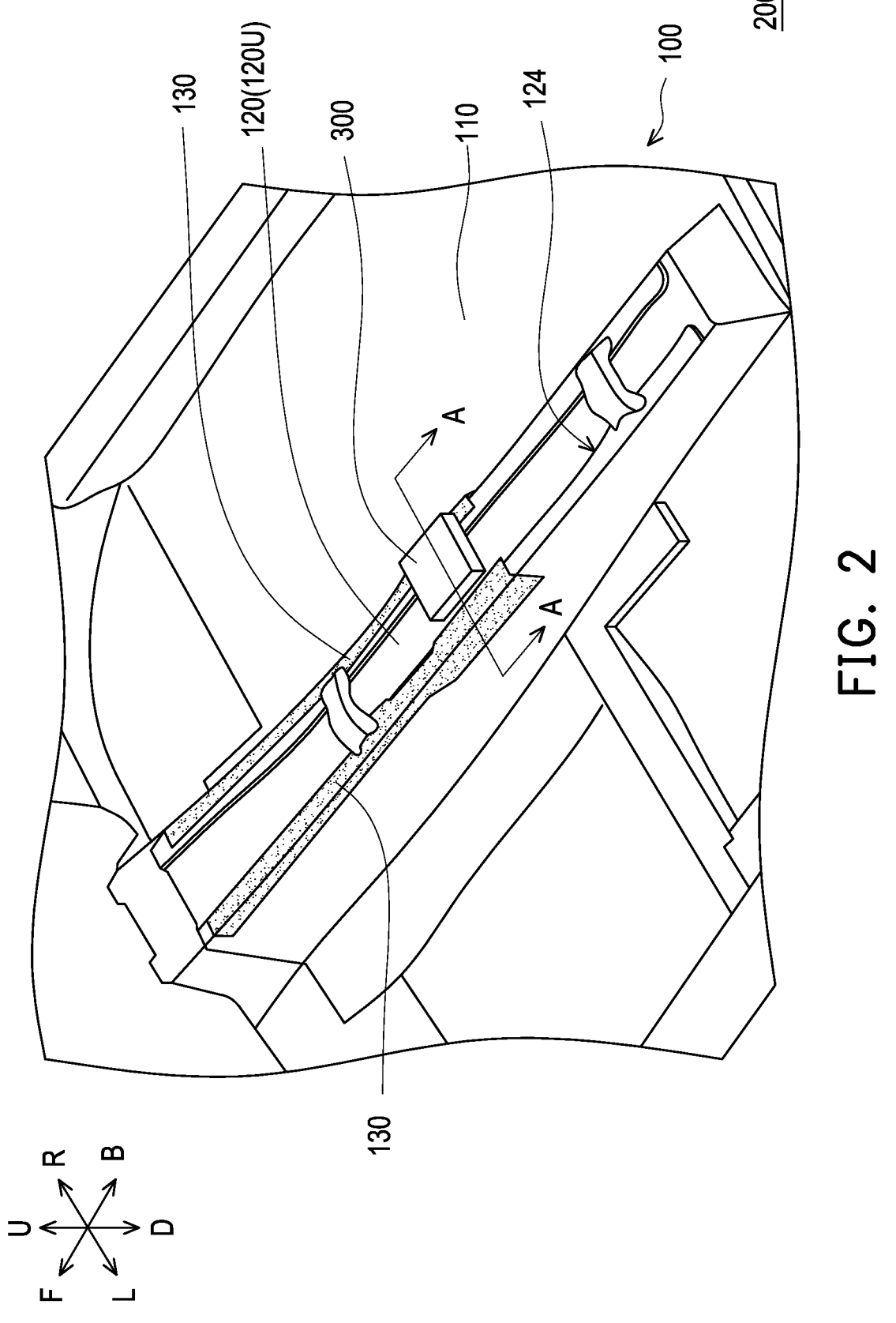
FIG. 2 is a schematic view of an installation structure configured to install a controller in a vehicle according to an embodiment of the disclosure.
Figure 3:
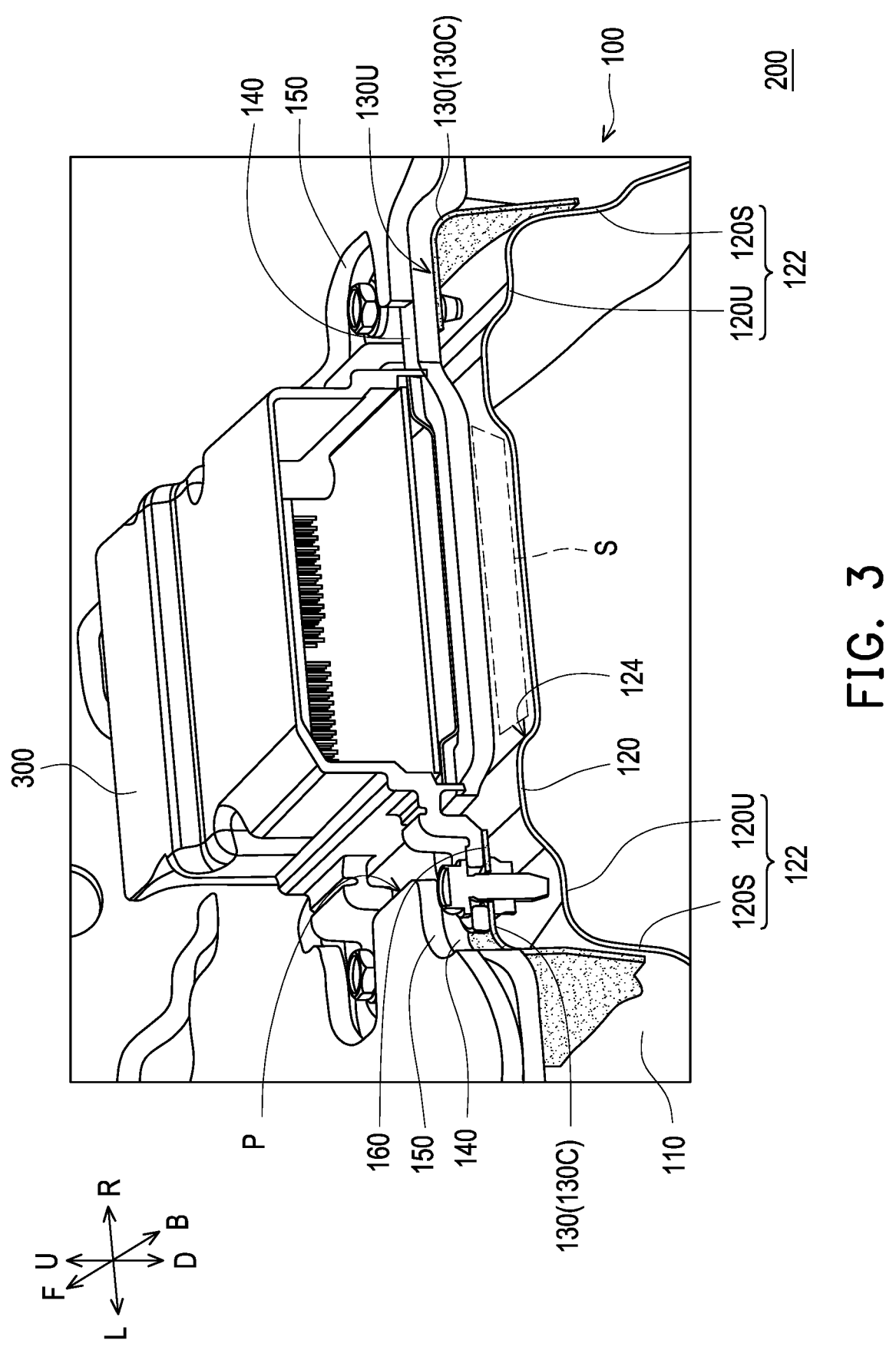
FIG. 3 is a partial cross-sectional schematic view of an installation structure along the line A-A in FIG. 2.

FIG. 2 is a schematic view of an installation structure configured to install a controller in a vehicle according to an embodiment of the disclosure. FIG. 3 is a partial cross-sectional schematic view of an installation structure along the line A-A in FIG. 2.

To understand the implementation of the installation structure 100 in one embodiment of the disclosure, reference may be made to FIG. 1 to FIG. 3. The installation structure 100 is disposed in the vehicle 200. The installation structure 100 is configured to install a controller 300. The controller 300 is, for example, a controller that deploys a supplementary restraint system (SRS). In response to the vehicle 200 being involved in a collision, the controller 300 transmits signals to the inflaters of the various airbags in the vehicle 200 to inflate the airbags.

The installation structure 100 includes: a floor panel 110, constituting a lower portion of a vehicle body 202 of the vehicle 200; a floor channel 120, disposed in the floor panel 110, located at a center in a width direction L-R of the vehicle 200, extending along a front-to-back direction F-B of the vehicle 200, and protruding on an upside U of the vehicle 200; a pair of brackets 130, connected to a corner 122 formed by a side surface 120S and an upper surface 120U of the floor channel 120; an insulator 140, configured to cover the floor panel 110 and the brackets 130; a carpet 150, disposed on the insulator 140; and a bracket protrusion 160, separated from the upper surface 120U of the floor channel 120 and fixing the controller 300 on the bracket protrusion 160. The controller 300 is fixed on the bracket protrusion 160 exposed from an opening P provided in the insulator 140 and the carpet 150. The insulator 140 and carpet 150 are disposed between the controller 300 and the floor channel 120. Spaces S and S1 are provided between the controller 300 and the floor channel 120.

In this way, by connecting a pair of brackets 130 to the corner 122 of the floor channel 120, the rigidity of the floor channel 120 may be increased, and the insulator 140 and the carpet 150 are disposed on the upside of the brackets 130 between the controller 300 and the floor channel 120 at the same time. In addition, the opening P is provided at the fixing portion of the floor channel 120, so the area for disposing of the insulator 140 and the carpet 150 may be increased, thereby improving the soundproofing effect. In addition, by providing a space S1 between the carpet 150 and the controller 300, impurities (moisture, etc.) from the carpet 150 may be prevented from adhering to the base 310 of the controller 300 (details may be referred to FIG. 4) to avoid corrosion of the base 310.

Figure 4:
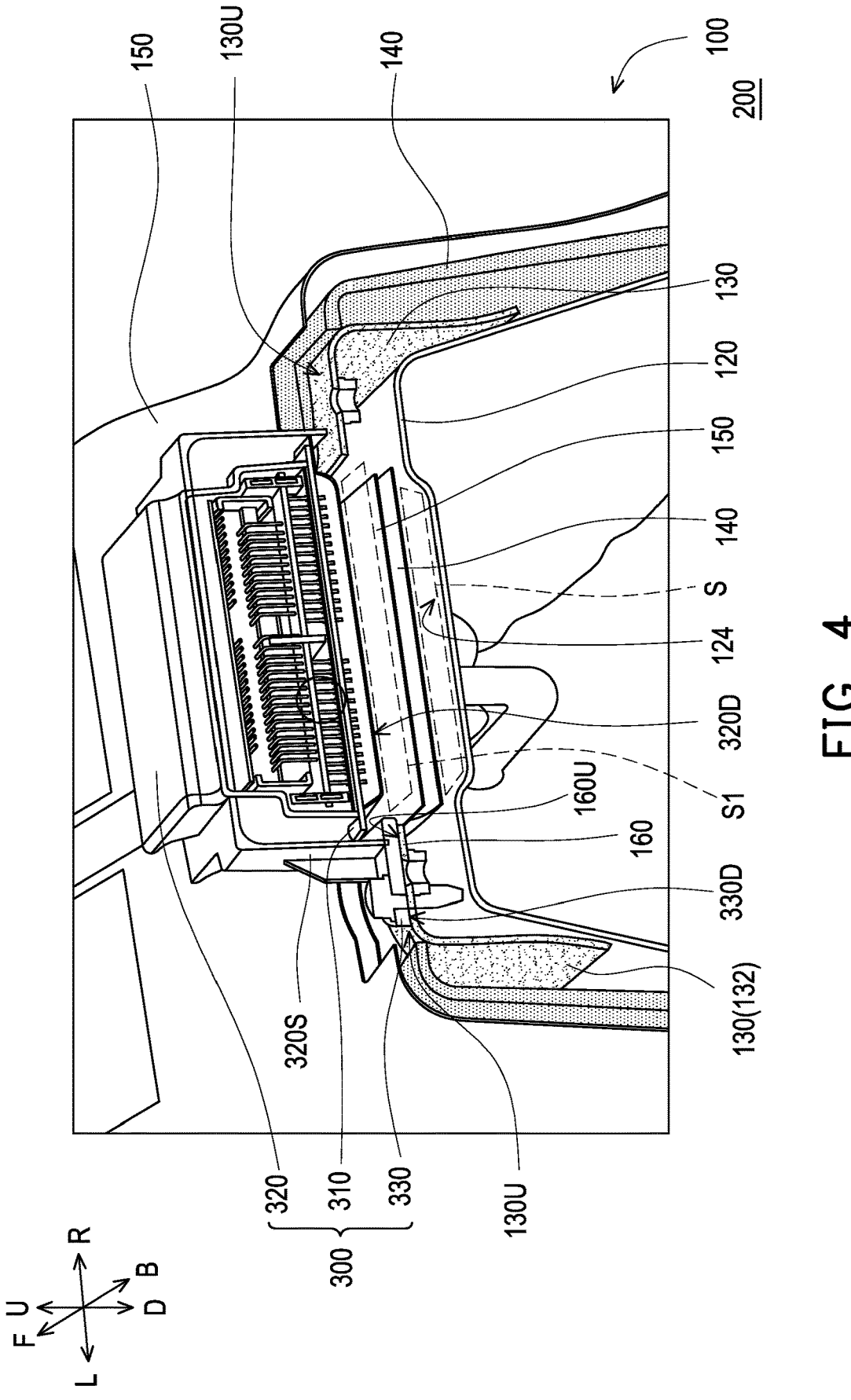
FIG. 4 is a partial cross-sectional schematic view of an installation structure observed from another viewing angle.

FIG. 4 is a partial cross-sectional schematic view of an installation structure observed from another viewing angle. Referring to FIG. 4, in an embodiment of the disclosure, the controller includes: a base 310; a unit housing 320, in which the base 310 is accommodated; and a leg portion 330, extending from a lower end of a side surface 320S of the unit housing 320 along the width direction L-R. In addition, the leg portion 330 is fixed to an upper surface 160U of the bracket protrusion 160.

In this way, in the installation structure 100 of this embodiment, by disposing of the leg portion 330 of the controller 300 at the lower end of the side surface 320S of the unit housing 320, a wider space S1 between the unit housing 320 and the carpet 150 may be ensured.

Referring to FIG. 4 again, the brackets 130 may be formed into an L-shape. The controller 300 may be fixed on a cantilever cross section 132 of the brackets 130.

In this way, by making the brackets 130 L-shaped and having a cantilever cross section 132, the carpet 150 and the insulator 140 may be disposed in a larger region, thereby improving the soundproofing effect.

Referring to FIG. 2 to FIG. 4 together, the floor channel 120 has a recession 124, the recession 124 is located at a center in the width direction L-R of the upper surface 120U of the floor channel 120, and the recession 124 extends along the front-to-back direction F-B of the vehicle 200.

In this way, by disposing of the recession 124 on the floor channel 120, the space S for inserting the carpet 150 and the insulator 140 may be made larger, thereby increasing the thickness of the carpet 150 and the insulator 140, and further enhancing the soundproofing effect. In addition, by disposing of the recession 124 on the floor channel 120, the rigidity of the floor channel 120 on the front-to-back direction F-B of the vehicle 200 may also be increased.

Referring to FIG. 4, in an up-to-down direction U-D of the vehicle 200, an upper surface 130U of the brackets 130 are disposed at a position not overlapping the recession 124 of the floor channel 120.

In this way, by disposing of the upper surface 130U of the brackets 130 at the position not overlapping the recession 124 of the floor channel 120, the area for configuration may be enlarged. That is, the carpet 150 may be installed more easily, and various parts may be installed smoothly in the following order: floor channel 120→brackets 130→insulator 140→carpet 150→controller 300.

Referring to FIG. 4 again, a lower surface 330D of the leg portion 330 of the controller 300 is disposed further lower than a lower surface 320D of the unit housing 320.

Since the leg portion 330 has a stepped appearance, the lower surface 330D of the leg portion 330 is lower than the lower surface 320D of the unit housing 320, so that the space may be increased.

Referring to FIG. 4 again, in addition to the space S provided between the insulator 140 and the floor channel 120, another space S1 may be provided between the lower surface 320D of the controller 300 and the carpet 150. In this way, impurities (moisture, etc.) from the carpet 150 may be prevented from adhering to the base 310 of the controller 300, and corrosion of the base 310 may be avoided.

Figure 5:
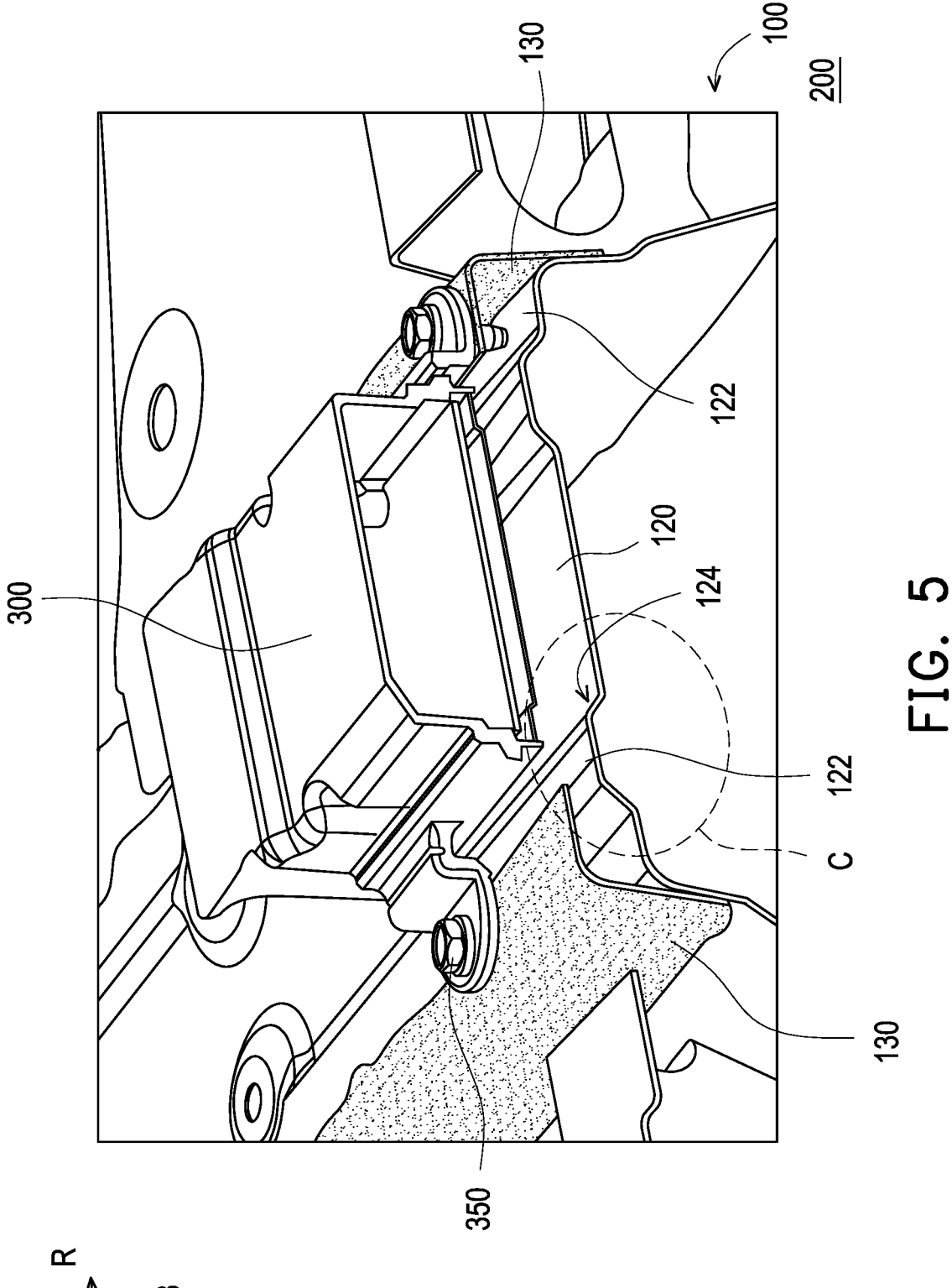
FIG. 5 is a partial cross-sectional schematic view with the insulator and the carpet removed from the installation structure in FIG. 3.

FIG. 5 is a partial cross-sectional schematic view with the insulator and the carpet removed from the installation structure in FIG. 3. Referring to FIG. 5, the corner 122 of the floor channel 120 is located outside the width direction L-R of the recession 124 of the floor channel 120. The corner 122 of the floor channel 120 has a stepped appearance and is located on a downside D of the vehicle 200 outside the width direction L-R (as shown at the circle C in FIG. 5).

In this way, by disposing of the corner 122 of the floor channel 120 as a stepped appearance, a storage space for a bolt 350 for fixing the controller 300 may be created. In addition, since the height of the controller 300 may be lowered by adjusting the amount of the bolt 350, in response to a lower height of the controller 300, sufficient space may be created on the downside of the controller 300, thereby expanding the indoor space.

Figure 6:
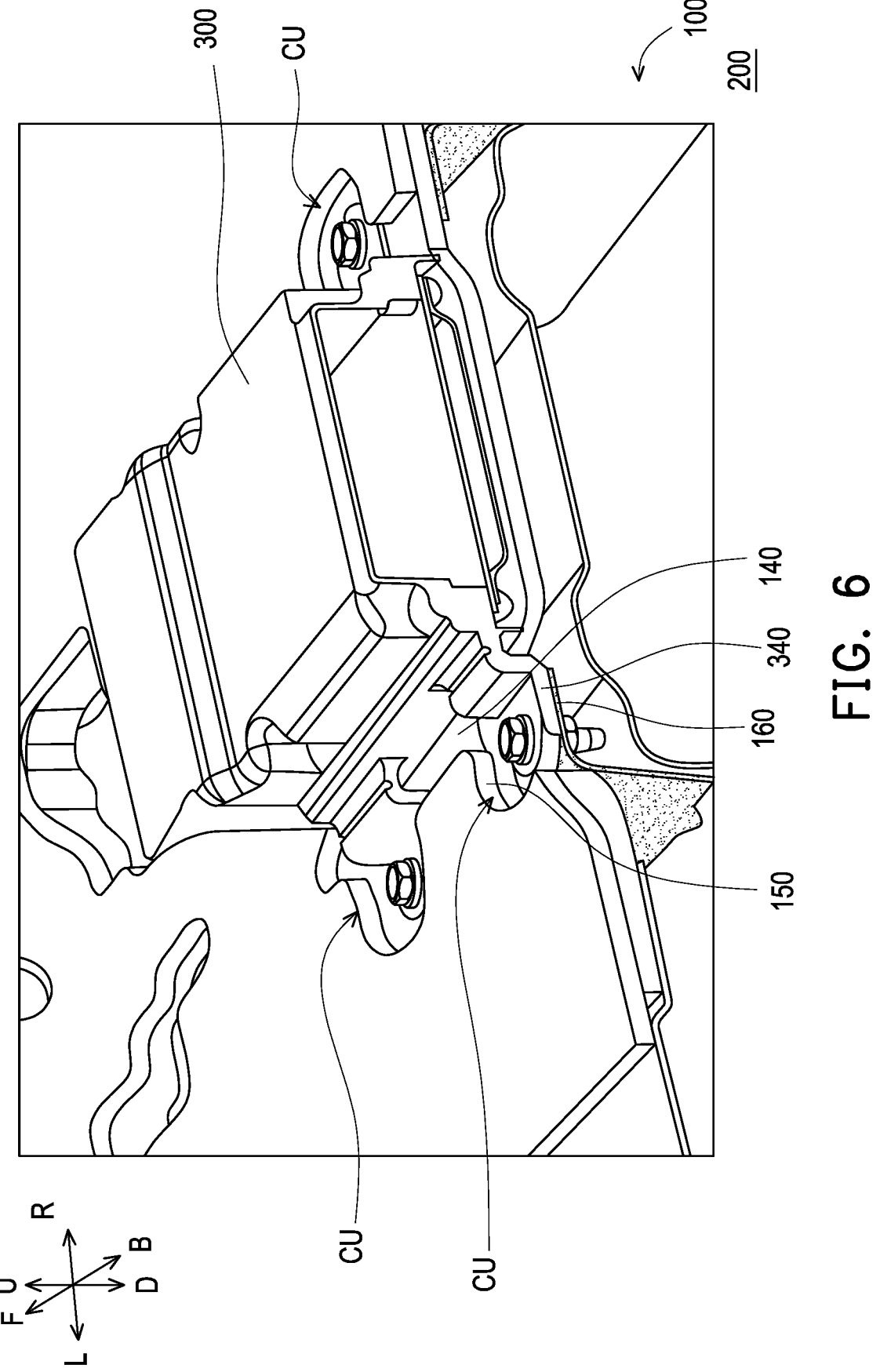
FIG. 6 is a partial cross-sectional schematic view of an installation structure observed from yet another viewing angle.

FIG. 6 is a partial cross-sectional schematic view of an installation structure observed from yet another viewing angle. Referring to FIG. 6, a cut CU is provided on the insulator 140 and the carpet 150 on two sides in the width direction L-R of the controller 300. The cut CU is disposed along the bracket protrusion 160 and a fixing portion 340 of the controller 300.

In this way, by disposing of the cut CU along the bracket protrusion 160 and the fixing portion 340 of the controller 300, the area of the carpet 150 and the insulator 140 may be increased, thereby improving the soundproofing effect.

Figure 7:
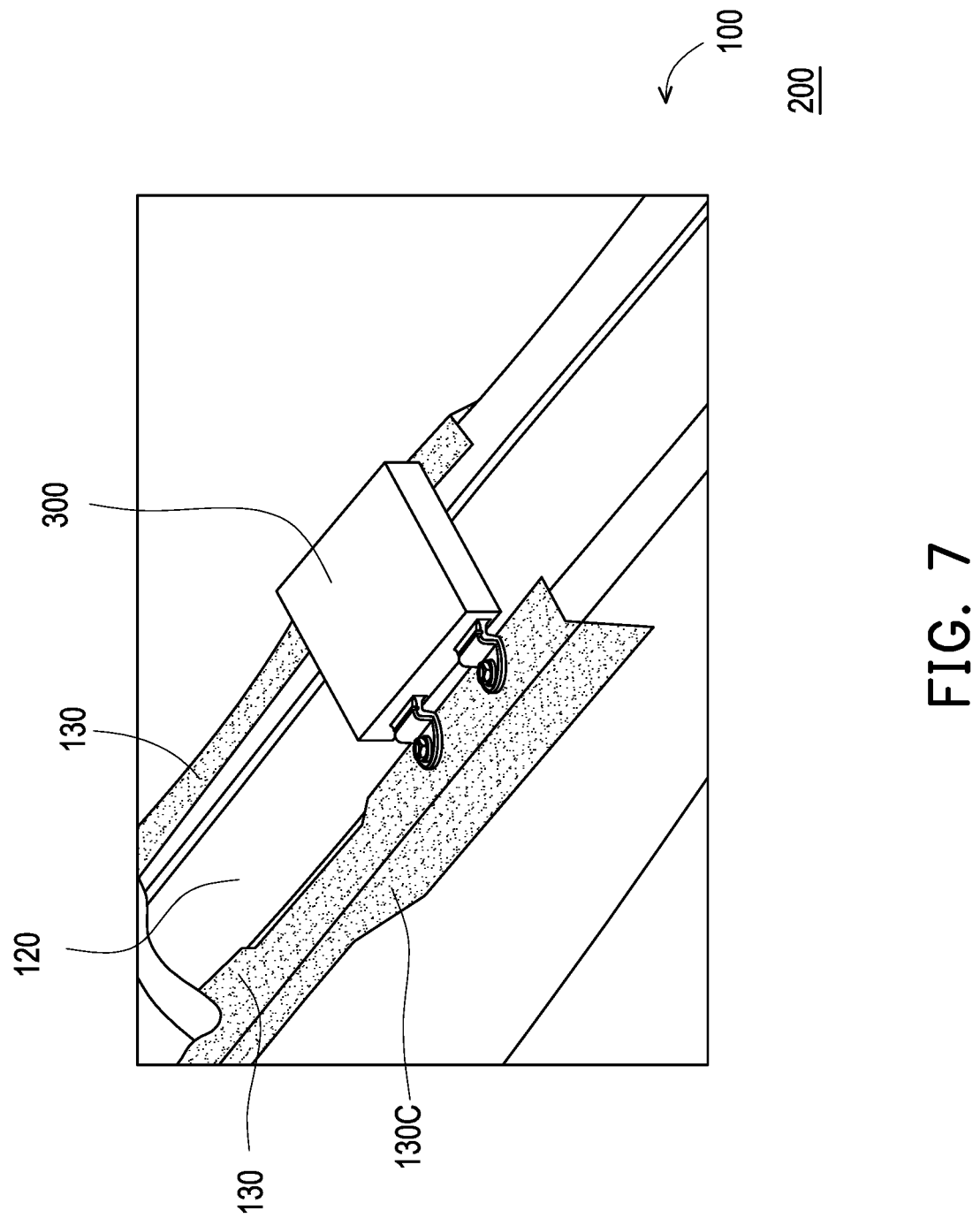
FIG. 7 is a partially enlarged schematic view of the installation structure in FIG. 2.

FIG. 7 is a partially enlarged schematic view of the installation structure in FIG. 2. Referring to FIG. 3 and FIG. 7, the brackets 130 are gradually inclined from the floor channel 120. The insulator 140 and the carpet 150 are disposed at an inclined position 130C of the brackets 130.

In this way, by gradually inclining the brackets 130, in response to the carpet 150 and the insulator 140 being disposed on the upside of the brackets 130, unnecessary floating of the carpet 150 may be suppressed and a gap may be reduced, thereby improving the soundproofing effect.

According to the technical solution of an embodiment of the disclosure, the disclosure further provides a vehicle 200 with the above-mentioned installation structure 100, which may achieve the technical effects of the above-mentioned installation structure 100.

In the installation structure 100 of the above-mentioned embodiment of the disclosure, the controller 300 is disposed on the upside of the brackets 130, which is connected to the floor channel 120 and extending along the front-to-back direction F-B of the vehicle 200 In addition, in the spaces S and S1 between the floor channel 120 and the controller 300, the insulator 140 and the carpet 150 are disposed. In this way, the insulator 140 and the carpet 150 may be disposed in the spaces S and S1 between the floor channel 120 and the controller 300 while the floor channel 120 is reinforced by the brackets 130, and the thickness of the insulator 140 may be increased, thereby improving the soundproofing effect.

Based on the above, in the installation structure and the vehicle having the installation structure of the disclosure, at least the technical functions described below are included.

By connecting a pair of brackets to the corner of the floor channel, the rigidity of the floor channel is increased, and the insulator and the carpet are disposed on the upside of the bracket between the controller and the floor channel at the same time. In addition, the opening is provided at the fixing portion of the floor channel, so the area for disposing of the insulator and the carpet may be increased, thereby improving the soundproofing effect. In addition, by providing a space between the carpet and the controller, impurities (moisture, etc.) from the carpet may be prevented from adhering to the base of the controller to avoid corrosion of the base.

By disposing of the leg portion of the controller at the lower end of the side surface of the unit housing, a wider space may be ensured between the unit housing and the carpet.

By disposing of the recession on the floor channel, the space for inserting the insulator and the carpet may be made larger, so that the thickness of the insulator and the carpet may be increased, and the soundproofing effect may be further enhanced. In addition, by disposing of the recession on the floor channel, the rigidity of the floor channel on the front-to-back direction of the vehicle may also be increased.

By disposing of the upper surface of the bracket at the position not overlapping the recession of the floor channel, the area for configuration may be enlarged. The carpet may be installed more easily and may be installed in the following order: floor channel→bracket→insulator→carpet→controller.

By disposing of the corner of the floor channel as a stepped appearance, a storage space for a bolt for fixing the controller may be created. In addition, since the height of the controller may be lowered by adjusting the amount of the bolt, in response to a lower height of the controller, sufficient space may be created on the downside of the controller, thereby expanding the indoor space.

By disposing of the cut along the bracket protrusion and the fixing portion of the controller, the area of the carpet and the insulator may be increased, thereby improving the soundproofing effect.

By gradually inclining the bracket, in response to the carpet and the insulator being disposed on the upside of the bracket, unnecessary floating of the carpet may be suppressed and a gap may be reduced, thereby improving the soundproofing effect.

Since the leg portion has a stepped appearance, the lower surface of the leg portion is lower than the lower surface of the unit housing, so that the space may be increased.

By making the bracket L-shaped and having a cantilever cross section, the carpet and the insulator may be disposed in a larger region, thereby improving the soundproofing effect.

Finally, it should be noted that the above embodiment is only used to illustrate the technical solution of disclosure, not to limit it; although the disclosure has been described in detail with reference to the aforementioned embodiment, those of ordinary skill in the art should understand that it is still possible to modify the technical solution described in the aforementioned embodiment, or perform an equivalent replacement of the portion or all technical features; these modifications or replacements do not make the essence of the corresponding technical solution out of the scope of the technical solution of the embodiment of disclosure.

What is claimed is:

1. An installation structure, disposed in a vehicle, wherein the installation structure is configured to install a controller, and the installation structure comprises:

a floor panel, constituting a lower portion of a vehicle body of the vehicle;

a floor channel, disposed in the floor panel, located at a center in a width direction of the vehicle, extending along a front-to-back direction of the vehicle, and protruding on an upside of the vehicle;

a pair of brackets, connected to a corner formed by a side surface and an upper surface of the floor channel;

an insulator, configured to cover the floor panel and the brackets;

a carpet, disposed on the insulator; and a bracket protrusion, separated from the upper surface of the floor channel and fixing the controller on the bracket protrusion; wherein the controller is fixed on the bracket protrusion exposed from an opening provided in the insulator and the carpet, the insulator and the carpet are disposed between the controller and the floor channel, and a space is provided between the controller and the floor channel, wherein the space includes:

a first space, formed between an upper surface of the floor channel and the controller, and a second space, formed between a side surface of the floor channel and the controller, wherein the insulator and the carpet are disposed in the first space and the second space.

2. The installation structure according to claim 1, wherein the controller comprises:

a base;

a unit housing, in which the base is accommodated; and a leg portion, extending from a lower end of a side surface of the unit housing along the width direction, wherein the leg portion is fixed to an upper surface of the bracket protrusion.

3. The installation structure according to claim 1, wherein the floor channel has a recession, the recession is located at a center in the width direction of the upper surface of the floor channel, and the recession extends along the front-to-back direction of the vehicle.

4. The installation structure according to claim 3, wherein in an up-to-down direction of the vehicle, an upper surface of the brackets is disposed at a position not overlapping the recession of the floor channel.

5. The installation structure according to claim 3, wherein the corner of the floor channel is located outside the width direction of the recession of the floor channel;

the corner of the floor channel has a stepped appearance and is located on a downside of the vehicle outside the width direction.

6. The installation structure according to claim 1, wherein a cut is provided on the insulator and the carpet on two sides in the width direction of the controller; and the cut is disposed along the bracket protrusion and a fixing portion of the controller.

7. The installation structure according to claim 1, wherein the bracket is gradually inclined from the floor channel; and the insulator and the carpet are disposed at an inclined position of the bracket.

8. The installation structure according to claim 2, wherein a lower surface of the leg portion of the controller is disposed further lower than a lower surface of the unit housing.

9. The installation structure according to claim 1, wherein the brackets are formed in an L-shape, the controller is fixed on a cantilever cross section of the bracket.

10. A vehicle, comprising:

the installation structure according to claim 1.

11. A vehicle, comprising:

the installation structure according to claim 2.

12. A vehicle, comprising:

the installation structure according to claim 3.

13. A vehicle, comprising:

the installation structure according to claim 4.

14. A vehicle, comprising:

the installation structure according to claim 5.

15. A vehicle, comprising:

the installation structure according to claim 6.

16. A vehicle, comprising:

the installation structure according to claim 7.

17. A vehicle, comprising:

the installation structure according to claim 8.

18. A vehicle, comprising:

the installation structure according to claim 9.

19. An installation structure, disposed in a vehicle, wherein the installation structure is configured to install a controller, and the installation structure comprises:

a floor panel, constituting a lower portion of a vehicle body of the vehicle;

a floor channel, disposed in the floor panel, located at a center in a width direction of the vehicle, extending along a front-to-back direction of the vehicle, and protruding on an upside of the vehicle;

a pair of brackets, connected to a corner formed by a side surface and an upper surface of the floor channel;

an insulator, configured to cover the floor panel and the brackets;

a carpet, disposed on the insulator; and a bracket protrusion, separated from the upper surface of the floor channel and fixing the controller on the bracket protrusion;

wherein the controller is fixed on the bracket protrusion exposed from an opening provided in the insulator and the carpet, the insulator and the carpet are disposed between the controller and the floor channel, and a space is provided between the controller and the floor channel, wherein the controller comprises:

a base;

a unit housing, in which the base is accommodated; and a leg portion, extending from a lower end of a side surface of the unit housing along the width direction, wherein the leg portion is fixed to an upper surface of the bracket protrusion.

20. An installation structure, disposed in a vehicle, wherein the installation structure is configured to install a controller, and the installation structure comprises:

a floor panel, constituting a lower portion of a vehicle body of the vehicle;

a floor channel, disposed in the floor panel, located at a center in a width direction of the vehicle, extending along a front-to-back direction of the vehicle, and protruding on an upside of the vehicle;

a pair of brackets, connected to a corner formed by a side surface and an upper surface of the floor channel;

an insulator, configured to cover the floor panel and the brackets;

a carpet, disposed on the insulator; and a bracket protrusion, separated from the upper surface of the floor channel and fixing the controller on the bracket protrusion;

wherein the controller is fixed on the bracket protrusion exposed from an opening provided in the insulator and the carpet, the insulator and the carpet are disposed between the controller and the floor channel, and a space is provided between the controller and the floor channel, wherein the brackets are formed in an L-shape, the controller is fixed on a cantilever cross section of the bracket.

* * * * *